No. 607,167. Patented July 12, 1898.
F. FONTNEAU.
REGISTERING CIGAR TIP CUTTER.
(Application filed May 20, 1897.)
(No Model.)
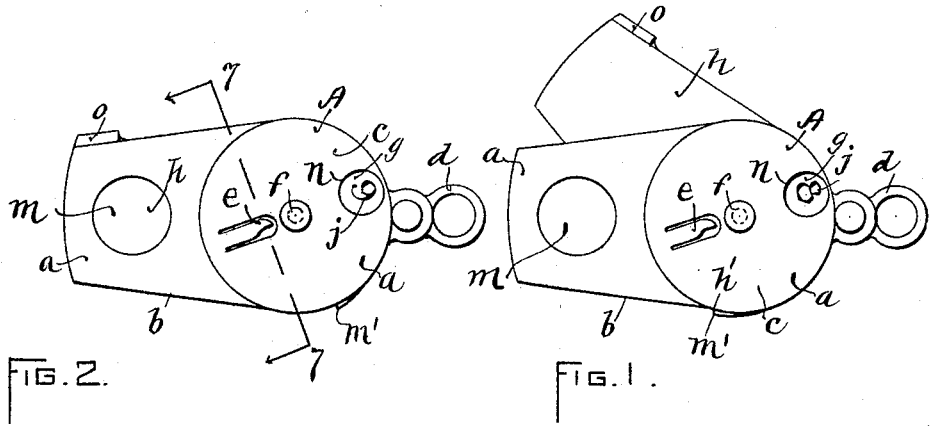
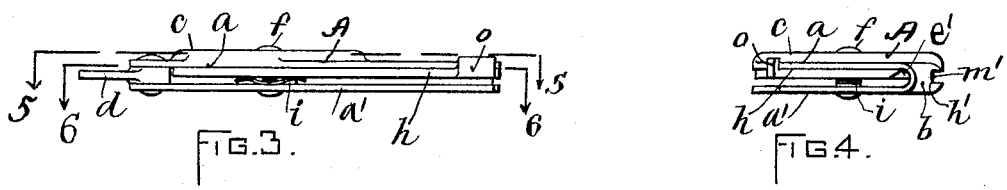
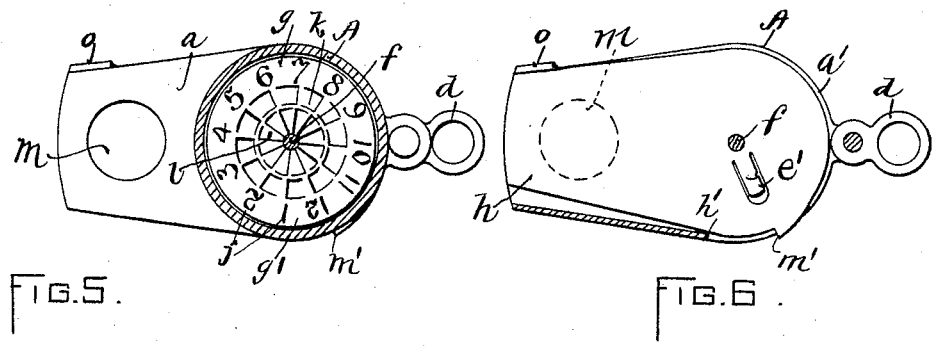
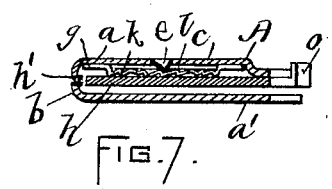
WITNESSES.
Harry J. Garceau
Charles W. Lynch
INVENTOR:
Frank Fontneau
BY S Scholfield
ATTY.

UNITED STATES PATENT OFFICE.

FRANK FONTNEAU, OF ATTLEBOROUGH, MASSACHUSETTS.

REGISTERING CIGAR-TIP CUTTER.

SPECIFICATION forming part of Letters Patent No. 607,167, dated July 12, 1898.

Application filed May 20, 1897. Serial No. 637,443. (No model.)

*To all whom it may concern:*

Be it known that I, FRANK FONTNEAU, a citizen of the United States, residing at Attleborough, in the county of Bristol and State of Massachusetts, have invented a new and useful Improvement in Registering Cigar-Tip Cutters, of which the following is a specification.

My invention consists in the improved construction and arrangement of parts whereby a register is automatically made of the number of cigars operated upon by the cutter, which is adapted to be worn as a watch-charm or carried in the pocket.

In the accompanying drawings, Figure 1 represents a side view of the cigar-tip cutter in its opened condition for receiving the tip of the cigar. Fig. 2 represents a side view of the same in its closed condition. Fig. 3 represents an edge view. Fig. 4 represents an end view. Fig. 5 represents a section taken in the line 5 5 of Fig. 3. Fig. 6 represents a section taken in the line 6 6 of Fig. 3. Fig. 7 represents a section taken in the line 7 7 of Fig. 2.

In the drawings, A represents the outer case, the sides of which are formed by folding two parts $a$ and $a'$ of a flat blank to a parallel position with a connecting bend $b$, a portion $c$ of the part $a$ of the blank being struck up in circular raised form, as shown in Figs. 2 and 3, the said outer case being provided with the perforations $m$, adapted to receive the tip of the cigar, and with the attaching-eye $d$. The raised portion $c$ of the side $a$ of the outer case is provided with the integral dog $e$ and the perforation $n$, and upon the pivot-pin $f$, which connects the sides $a$ and $a'$ of the outer case, are loosely placed the registering-disk $g$, the cutter $h$, and the friction-spring $i$, the said registering-disk $g$ being provided at the outer edge portion of its face $g'$ with the series of figures $j$ and with the impressed circular series of ratchet teeth or notches $k$ and $l$, the inner circular series of teeth or notches $l$ being adapted for the engagement of the dog $e$ therewith to prevent the backward movement of the registering-disk. The cutter $h$ is provided with the turned lip $o$, which forms a thumb-piece for the operation of the cutter and with the integral dog $e'$ for imparting the rotation of the registering-disk, whereby at the time of cutting off the tip of the cigar the registering-disk $g$ will be rotated to the extent of one of the numbered spaces. The shoulder $m'$ at the rear portion of the cutter $h$ by engagement with the shoulder $h'$ of the connecting bend $b$ of the outer case serves to limit the outward movement of the cutter upon its pivot-pin $f$.

I claim as my invention—

The combination of the outer case having perforated opposite sides to receive the point of a cigar, and a side perforation for access to the registering-disk, and the dog connected with the case and serving to prevent the backward movement of the registering-disk, with the pivoted registering-disk provided with the series of ratchet teeth or notches, and the pivoted cutter provided with the dog for imparting forward movement to the registering-disk, substantially as described.

FRANK FONTNEAU.

Witnesses:
SOCRATES SCHOLFIELD,
CHARLES W. LYNCH.